US012005537B1

(12) United States Patent
Winter, III et al.

(10) Patent No.: US 12,005,537 B1
(45) Date of Patent: Jun. 11, 2024

(54) FASTENER REMOVAL ASSEMBLY FOR AUTOMATED TEMPORARY FASTENER REMOVAL

(71) Applicant: Lockheed Martin Corporation, Bethesda, MD (US)

(72) Inventors: Max Nelson Winter, III, Fort Worth, TX (US); David Bielski, Fort Worth, TX (US); Ashish Prashant Kulkarni, Allen, TX (US); Jay A. Smith, Aledo, TX (US); Tyler Martin Rup, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/298,715

(22) Filed: Apr. 11, 2023

(51) Int. Cl.
*B23P 19/06* (2006.01)
(52) U.S. Cl.
CPC .................. *B23P 19/065* (2013.01)
(58) Field of Classification Search
CPC ......... B23P 19/04; B23P 19/06; B23P 19/065; Y10T 29/5383
See application file for complete search history.

(56) References Cited

U.S. PATENT DOCUMENTS

| | | | |
|---|---|---|---|
| 3,069,761 A * | 12/1962 | Sommer | B25B 27/026 294/206 |
| 6,755,407 B1 | 6/2004 | Olson et al. | |
| 6,763,564 B2 * | 7/2004 | Ilies | B23P 19/069 29/721 |
| 7,048,266 B2 | 5/2006 | Starr | |
| 8,534,651 B2 | 9/2013 | Scapa et al. | |
| 9,102,019 B2 | 8/2015 | Negroni et al. | |
| 9,687,946 B2 | 6/2017 | Cole et al. | |
| 10,639,774 B2 | 5/2020 | Bennett et al. | |
| 11,235,375 B2 | 2/2022 | Oberoi et al. | |
| 11,370,036 B2 | 6/2022 | Cai et al. | |
| 2015/0059139 A1 | 3/2015 | Dantas | |
| 2019/0338799 A1 | 11/2019 | Niklewicz | |
| 2023/0226673 A1 * | 7/2023 | Stücker | B25B 27/143 29/456 |

FOREIGN PATENT DOCUMENTS

| | | |
|---|---|---|
| CN | 112571417 B | 3/2021 |
| CN | 115027694 B | 9/2022 |

* cited by examiner

*Primary Examiner* — Sarang Afzali
(74) *Attorney, Agent, or Firm* — Baker Botts L.L.P.

(57) ABSTRACT

A fastener removal assembly comprises a drive housing operable to receive a drive unit, wherein the drive housing comprises a shaft configured to rotate based on operation of the drive unit, the shaft extending downwards and out of the drive housing. The fastener removal assembly further comprises a set of gripping jaws disposed under the drive housing and around a portion of the shaft and a first pneumatic actuator coupled to the set of gripping jaws configured to actuate the set of gripping jaws to expand and retract. The fastener removal assembly further comprises at least one second pneumatic actuator disposed on top of the first pneumatic actuator. The fastener removal assembly further comprises an intermediate coupler, wherein the intermediate coupler is coupled to a side of the drive housing, and wherein the at least one second pneumatic actuator is coupled to a bottom side of the intermediate coupler.

11 Claims, 4 Drawing Sheets

FASTENER REMOVAL ASSEMBLY FOR AUTOMATED TEMPORARY FASTENER REMOVAL

TECHNICAL FIELD

This disclosure generally relates to robotic equipment, and more specifically to a fastener removal assembly for automated temporary fastener removal.

BACKGROUND

Temporary fasteners, such as Cleco fasteners, are used in manufacturing processes to hold different materials together. As the materials are held together, a user may perform other processes to physically join the materials. Afterwards, the temporary fasteners have to be removed from the joined materials for further assembly operations. Current processes to remove the temporary fasteners are manual and time-consuming. Further, application of sealants on or around the temporary fasteners increase the difficulty in removal. There exists a need for an improved process for removing temporary fasteners.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4B, where like numbers are used to indicate like and corresponding parts.

The disclosed systems and methods provide for a fastener removal assembly configured to address the aforementioned problems by performing automated removal of temporary fasteners. The disclosed fastener removal assembly is further configured to provide feedback through sensor connections that indicate torque and force feedback to a robotic arm, wherein the fastener removal assembly may be coupled to an end of the robotic arm. In embodiments, the robotic arm may be actuated to move and position the fastener removal assembly in relation to a designated temporary fastener for removal. Power for the fastener removal assembly may be provided by wired connections to the robotic arm.

Figure 1:
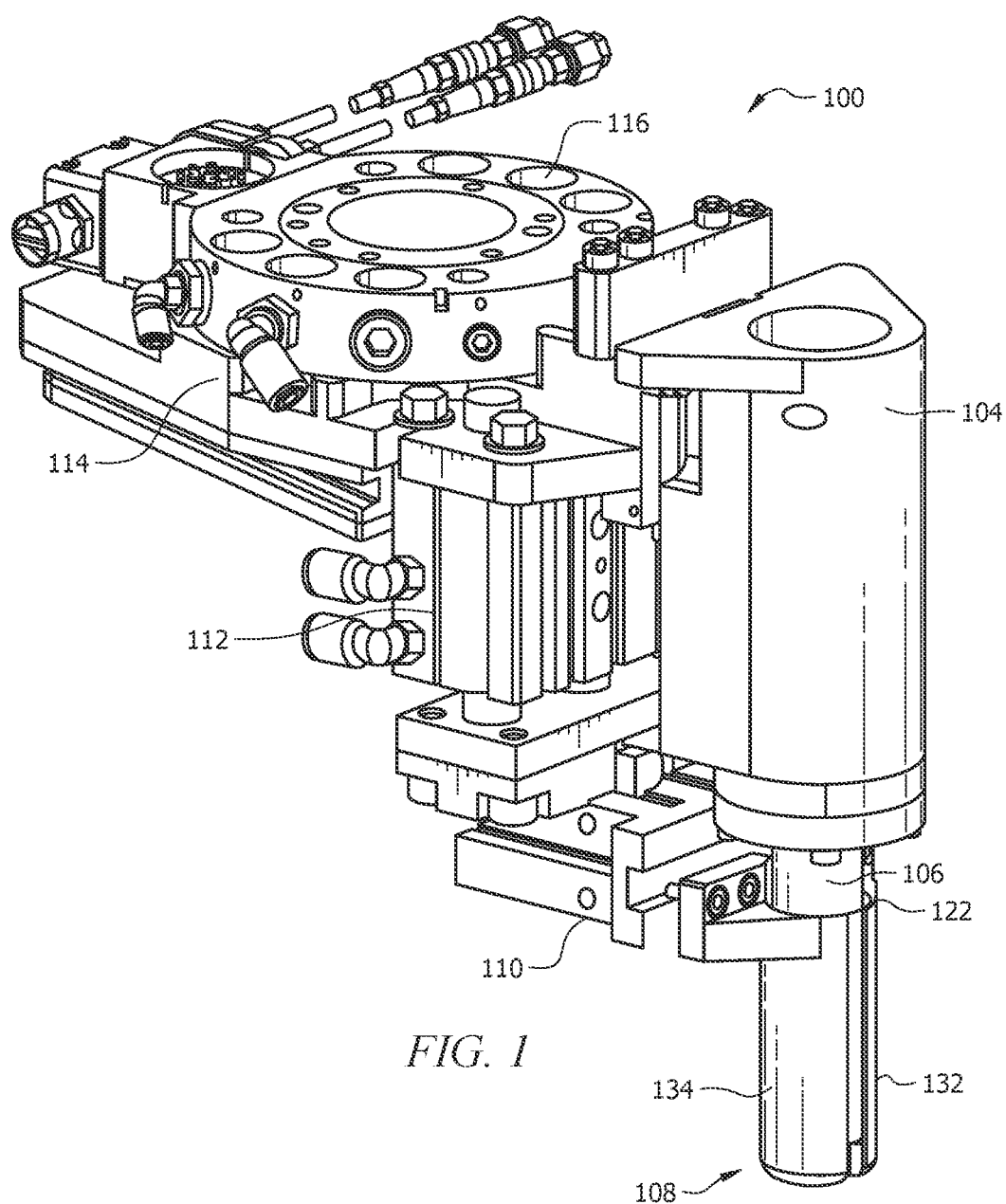
FIG. 1 illustrates a perspective view of an example fastener removal assembly, according to certain embodiments.
Figure 2:
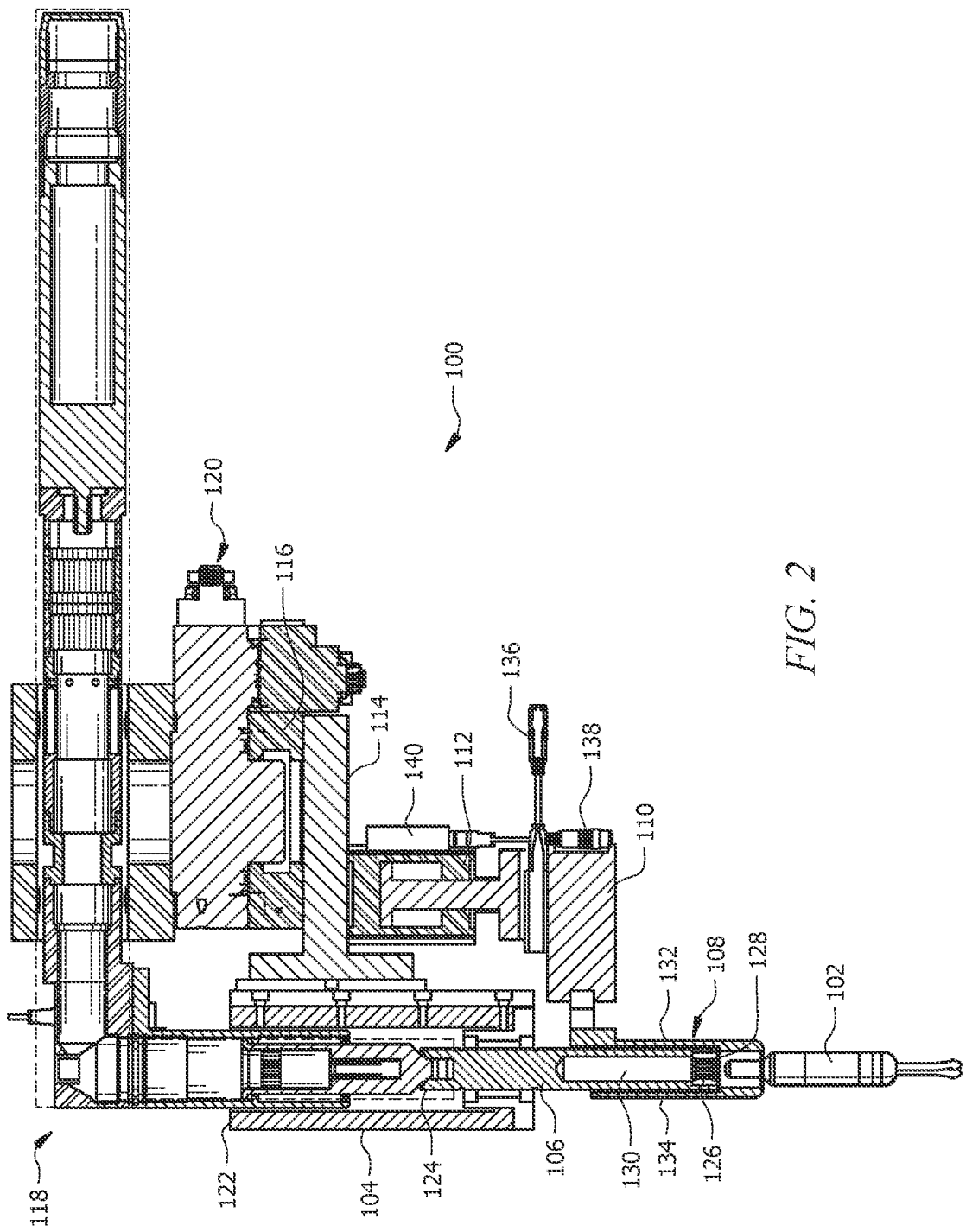
FIG. 2 illustrates a cross-sectional view of the fastener removal assembly in FIG. 1 coupled to a robotic arm, according to certain embodiments.

FIGS. 1 and 2 illustrate an example fastener removal assembly 100. FIG. 1 illustrates a perspective view of the fastener removal assembly 100, and FIG. 2 illustrates a cross-sectional view of the fastener removal assembly 100. The fastener removal assembly 100 may be configured to remove one or more temporary fasteners 102 (shown in FIG. 2) that are engaged with and securing at least two panels of material. In one or more embodiments, the fastener removal assembly 100 may be configured to clamp onto at least a portion of each fastener 102, rotate the fastener 102, manipulate the fastener 102 to break free of any present sealant, and retract away from the at least two panels of material thereby removing the fastener 102 from the at least two panels of material. As illustrated, the fastener removal assembly 100 may comprise a drive housing 104, a shaft 106, a set of gripping jaws 108, a first pneumatic actuator 110, a second pneumatic actuator 112, an intermediate coupler 114, and a quick-connect change plate 116.

In one or more embodiments, the drive housing 104 may be any suitable size, height, shape, and any combinations thereof. In embodiments, the drive housing 104 may comprise any suitable materials, including, but not limited to, metals, nonmetals, polymers, ceramics, composites, and any combinations thereof. The drive housing 104 may be configured to receive a drive unit 118 provided by a robotic arm (not shown). In one or more embodiments, an end 120 of the robotic arm may be securably coupled to the fastener removal assembly 100 via the quick-connect change plate 116, wherein the end 120 may at least partially house or contain the drive unit 118. The drive unit 118 may be configured to provide rotation to and drive the shaft 106 of the fastener removal assembly 100 during operations. As illustrated, the drive unit 118 may generally be L-shaped, but the drive unit 118 may be any other suitable shape and/or size. The drive unit 118 may be inserted into a top end 122 of the drive housing 104 and may couple to a proximal end 124 of the shaft 106.

In one or more embodiments, the shaft 106 may be contained at least partially within the drive housing 104. The shaft 106 may be configured to extend downwards and out of the drive housing 104. During operations, the shaft 106 may rotate in conjunction with operation of the drive unit 118. The drive unit 118 may be configured to provide torque to the shaft 106 in order to actuate the shaft 106. As illustrated, the shaft 106 may comprise a sprag clutch 126 disposed at a distal end 128 of the shaft. The sprag clutch 126 may be configured to receive the fastener 102. In one or more embodiments, the sprag clutch 126 may receive a top portion of the fastener 102 and may actuate the top portion to rotate with respect to a housing of the fastener 102 (discussed further below). The shaft 106 may further comprise a chamber 130 disposed adjacent to the sprag clutch 126, wherein the chamber 130 may extend at least partially within the shaft 106. The chamber 130 may be configured to receive at least a portion of the top portion of the fastener 102 and may provide space for the top portion of the fastener 102 to extend further into the shaft 106 during operations.

As illustrated, the set of gripping jaws 108 may be disposed under the drive housing 104 and around a portion of the shaft 106. The set of gripping jaws 108 may comprise a first jaw 132 and a second jaw 134 that each extend past the distal end 128 of the shaft 106. In embodiments, the set of gripping jaws 108 may comprise any suitable number of jaws (such as first jaw 132 and second jaw 134), and the present disclosure is not limited to two illustrative jaws. The set of gripping jaws 108 may be configured to receive the housing of each fastener 102 and apply a radial, compressive force to secure the housing of the fastener 102. For example, as the fastener removal assembly 100 may be disposed over and around the fastener 102, the fastener 102 may be inserted through the set of gripping jaws 108 and into distal end 128 of the shaft 106. The set of gripping jaws 108 may be actuated 108 to apply a radial, compressive force against the fastener 102. The shaft 106 may be actuated to rotate, and the sprag clutch 126 may provide rotation upon the fastener 102.

In one or more embodiments, the first pneumatic actuator 110 may be coupled to the set of gripping jaws 108 and configured to actuate the set of gripping jaws 108 to expand and retract in a radial direction. Any suitable pneumatic actuator may be used as the first pneumatic actuator 110 in order to expand and retract the set of gripping jaws 108. While the present disclosure may contemplate the first pneumatic actuator 110 as a pneumatic actuator, any other suitable actuation means, such as mechanical, electrical, hydraulic, and any combinations thereof may be used in place of the first pneumatic actuator 110. The first pneumatic actuator 110 may be connected to an external air supply via an air connection 136, wherein air supplied via air connection 136 may actuate the first pneumatic actuator 110. As illustrated, the second pneumatic actuator 112 may be disposed on top of the first pneumatic actuator 110.

The second pneumatic actuator 112 may operate similarly to the first pneumatic actuator 110. For example, the second pneumatic actuator 112 may be connected to an external air supply via an air connection 138, wherein air supplied via air connection 138 may actuate the second pneumatic actuator 112. In embodiments, the air supply may be the same or different for first pneumatic actuator 110 and second pneumatic actuator 112. Any suitable pneumatic actuator may be used as the second pneumatic actuator 112. While the present disclosure may contemplate the second pneumatic actuator 112 as a pneumatic actuator, any other suitable actuation means, such as mechanical, electrical, hydraulic, and any combinations thereof may be used in place of the second pneumatic actuator 112. The second pneumatic actuator 112 may be configured to provide compliance control for the fastener removal assembly 100. For example, the second pneumatic actuator 112 may be configured to increase or decrease the distance of the fastener 102 secured within the shaft 106 and set of gripping jaws 108 from the end 120 of the robotic arm. If there is a determination that too much torque and/or force is being applied to the fastener 102 during removal, the second pneumatic actuator 112 may actuate to increase or decrease the aforementioned distance to provide compliance.

In one or more embodiments, the fastener removal assembly 100 may further comprise a sensor 140 associated with the first pneumatic actuator 110 and/or second pneumatic actuator 112. The sensor 140 may be configured to provide positional data of the first pneumatic actuator 110 and/or second pneumatic actuator 112 to a controller of the robotic arm. The controller of the robotic arm may include one or more interface(s), processing circuitry, memory(ies), and/or other suitable element(s) (such as a display). Interface may receive input, sends output, processes the input and/or output, and/or performs other suitable operation. Interface may comprise hardware and/or software.

Processing circuitry may perform or manages the operations of the controller. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) may store information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 3:
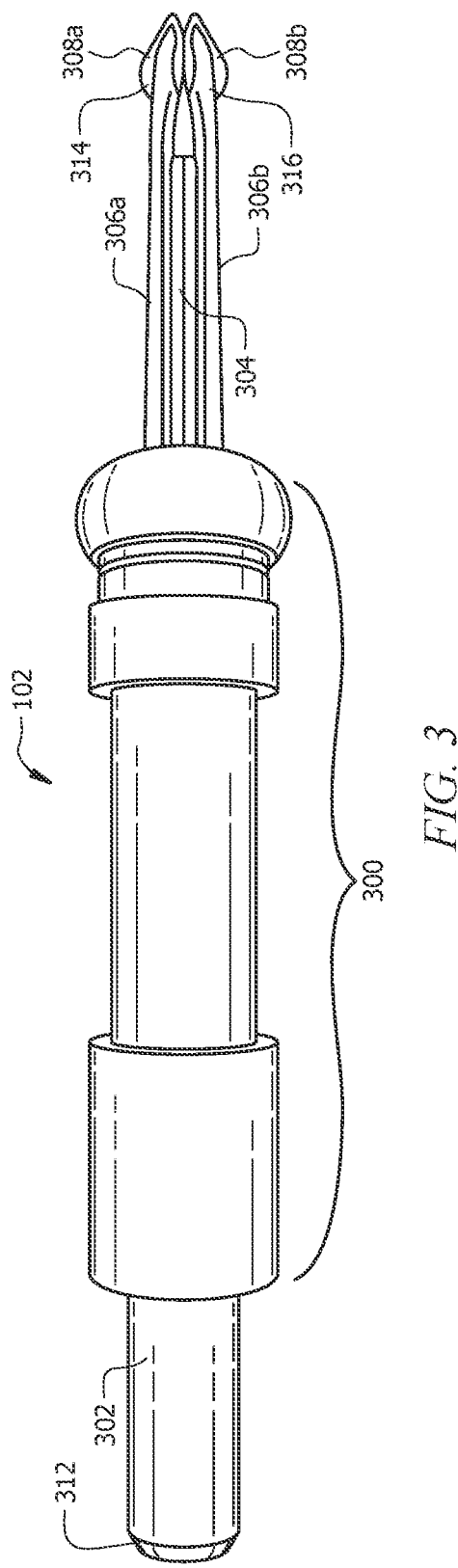
FIG. 3 illustrates an example temporary fastener, according to certain embodiments.

FIG. 3 illustrates an example temporary fastener 102. In one or more embodiments, the fastener 102 may be any suitable size, height, shape, and any combinations thereof. In embodiments, the fastener 102 may comprise any suitable materials, including, but not limited to, metals, nonmetals, polymers, ceramics, composites, and any combinations thereof. Without limitations, the fastener 102 may be any suitable fastener. In one or more embodiments, the fastener 102 is a Cleco fastener. The fastener 102 may comprise a housing 300, a body 302, a spreader bar 304, a pair of tines 306, a pair of barbs 308, and a gasket 310. The housing 300 may be configured to contain at least a portion of the body 302, wherein the body 302 may be configured to translate in a reversible direction with respect to the housing 300. For example, the body 302 may be disposed within and secured to the housing 300. In one or more embodiments, the body 302 may be threaded into and with the interior of the housing 300. During operations, a top portion 312 of the body 302 extending out from the housing 300 may be rotated to translate the body 302 along a central axis of the housing 300.

The spreader bar 304 may be coupled to an end of the housing opposite from the top portion 312. As illustrated, the spreader bar 304 may extend outwards from the housing 300, wherein the pair of tines 306 may be disposed adjacent to the spreader bar 304. A first tine 306*a* may be disposed along one side of the spreader bar 304, and a second tine 306*b* may be disposed along an opposing side of the spreader bar 304, wherein the pair of tines 306 may each be coupled to the body 302. As the body 302 is actuated to rotate, the spreader bar 304 may remain stationary, and the pair of tines 306 may translate along with the body 302. In one or more embodiments wherein the pair of tines 306 retract backwards into the housing 300, the spreader bar 304 may be configured to force the pair of tines 306 to expand outwards in a radial direction. In one or more embodiments wherein the pair of tines 306 extend outwards from the housing 300, a distance between the pair of tines 306 may decrease in the radial direction. The pair of barbs 308 may be disposed at a distal end of the pair of tines 306. A first barb 308a may be disposed at a distal end 314 of the first tine 306a, and a second barb 308b may be disposed at a distal end 31 of the second tine 306b. In embodiments, the pair of barbs 308 may translate, expand, and retract subsequently as the pair of tines 306 are actuated.

Figure 4A:
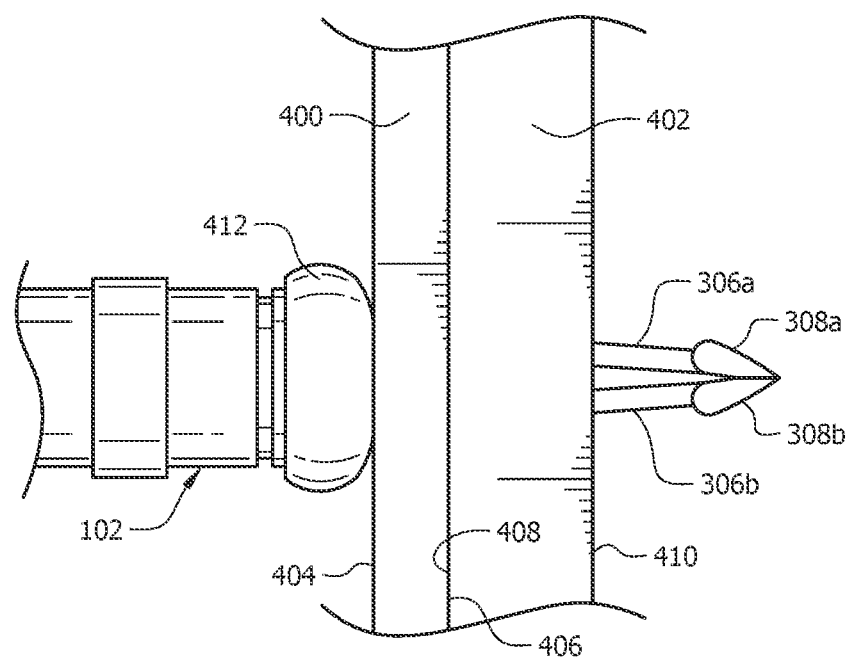
FIGS. 4A-4B illustrate the temporary fastener of FIG. 3 coupling separate panels of material together, according to certain embodiments.
Figure 4B:
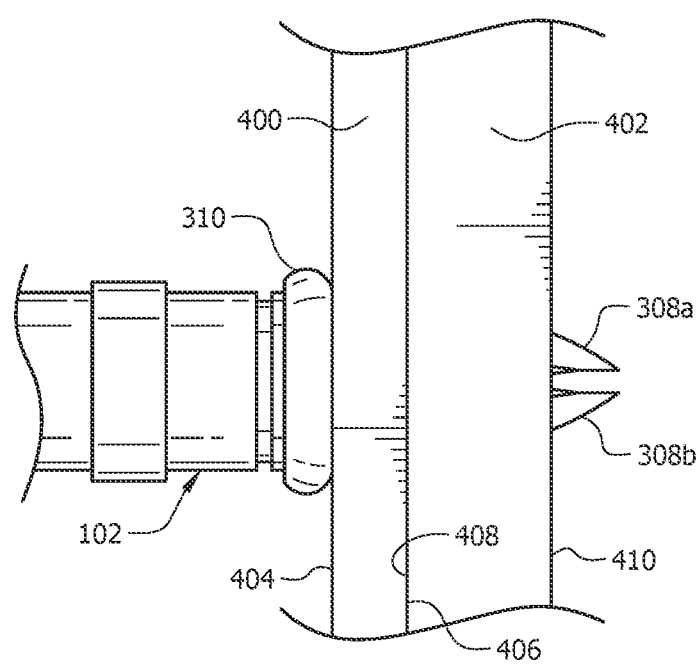

FIGS. 4A and 4B illustrate the temporary fastener 102 coupling separate panels of material together. As illustrated, the fastener 102 may be at least partially inserted through a first panel 400 of material and a second panel 402 of material, wherein there may be a hole defined within each to accommodate the fastener 102. The first panel 400 of material and the second panel 402 of material may each be any suitable size, height, shape, and any combinations thereof. In embodiments, the first panel 400 of material and the second panel 402 of material may each comprise any suitable materials, including, but not limited to, metals, nonmetals, polymers, ceramics, composites, and any combinations thereof. In embodiments, the pair of tines 306 and pair of barbs 308 may be inserted through a first side 404 of the first panel 400 and exit out a second side 410 of the second panel 402, wherein a second side 406 of the first panel 400 is disposed against a first side 408 of the second panel 402. To exert a force and clamp the panels 400, 402 together, a user may rotate the body 302 (referring to FIG. 3) of the fastener 102 to retract the pair of tines 306. As the pair of tines 306 retract, the spreader bar 304 (referring to FIG. 3) may cause the pair of tines 306, and subsequently the pair of barbs 308 to expand in a radial direction. The pair of barbs 308 may be expanded past the size of the hole of the panels 400, 402 and come to rest against the second side 410 of the second panel 402. The fastener 102 may be further actuated and may cause the pair of barbs 308 to exert a force backwards against the second panel 402. As illustrated, a gasket 412 may be disposed at an end of the housing 300 (referring to FIG. 3) operable to provide protection for the housing 300 and/or to the first panel 400. A compressive force may be applied onto both the first panel 400 and second panel 402 between the gasket 412 and pair of barbs 308, thereby temporarily securing the first panel 400 to the second panel 402.

With reference to FIGS. 1-4B, a method as presented in the present disclosure may be described. The method may comprise attaching the fastener removal assembly 100 o the end 120 of the robotic arm and securing the drive unit 118 within the drive housing 104. The method may further comprise actuating the robotic arm to position the fastener removal assembly 100 around at least a portion of the fastener 102, such as around the housing 300. The method may further comprise actuating the fastener removal assembly 100 to remove the fastener 102 from the first panel 400 and/or the second panel 402, wherein actuating the fastener removal assembly 100 comprises: actuating the set of gripping jaws 108, to apply a radial compressive force onto the housing 300 of the fastener 102 to secure the fastener 102, actuating the drive unit 118 to rotate the sprag clutch 126, rotating the top portion 312 of the fastener 102, actuating the robotic arm to provide rotation to the fastener 102 within a hole defined in the first panel 400 and/or the second panel 402 after rotating the top portion 312 of the fastener 102, and translating the fastener removal assembly 100 in a direction away from the first panel 400 and/or the second panel 402. The method may further comprise measuring torque and/or force applied to the fastener 102, and communicating the measurements to a controller of the robotic arm.

Previous methods provided for manually removing one or more fasteners 102. The fastener removal assembly 100 described herein may decrease the amount of time required to remove each fastener 102 and increase overall efficiency. Further, the fastener removal assembly 100 may provide feedback and adjust the torque/force applied to a fastener 102 during removal.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A fastener removal assembly the assembly comprising:
    a drive housing operable to receive a drive unit, wherein the drive housing comprises a shaft configured to rotate based on operation of the drive unit, the shaft extending downwards and out of the drive housing;
    a set of gripping jaws disposed under the drive housing and around a portion of the shaft;
    a first pneumatic actuator coupled to the set of gripping jaws and configured to actuate the set of gripping jaws to expand and retract in a radial direction;
    at least one second pneumatic actuator disposed on top of the first pneumatic actuator;

a sprag clutch disposed at a distal end of the shaft configured to receive a fastener; and an intermediate coupler, wherein the intermediate coupler is coupled to a side of the drive housing, and wherein the at least one second pneumatic actuator is coupled to a bottom side of the intermediate coupler.

2. The fastener removal assembly of claim 1, further comprising a quick-connect change plate configured to receive an end of a robotic arm, wherein the quick-connect change plate is disposed on top of the intermediate coupler.

3. The fastener removal assembly of claim 1, wherein the shaft further comprises a chamber disposed adjacent to the sprag clutch extending at least partially into the shaft.

4. The fastener removal assembly of claim 1, wherein the sprag clutch is configured to receive a top portion of a body of the fastener and actuate the top portion to rotate with respect to a housing of the fastener.

5. The fastener removal assembly of claim 4, wherein the set of gripping jaws is configured to receive the housing of the fastener and apply a radial compressive force to secure the housing of the fastener.

6. The fastener removal assembly of claim 1, further comprising a pneumatic sensor associated with the at least one second pneumatic actuator configured to provide positional data of the at least one second pneumatic actuator for compliance.

7. A fastener removal assembly, the assembly comprising:

a drive housing operable to receive a drive unit, wherein the drive housing comprises a shaft configured to rotate based on operation of the drive unit, the shaft extending downwards and out of the drive housing;

a set of gripping jaws disposed under the drive housing and around a portion of the shaft;

a first pneumatic actuator coupled to the set of gripping jaws and configured to actuate the set of gripping jaws to expand and retract in a radial direction;

a sprag clutch disposed at a distal end of the shaft configured to receive a fastener; and an intermediate coupler, wherein the intermediate coupler is coupled to a side of the drive housing.

8. The fastener removal assembly of claim 7, further comprising a quick-connect change plate configured to receive an end of a robotic arm, wherein the quick-connect change plate is disposed on top of the intermediate coupler.

9. The fastener removal assembly of claim 7, wherein the shaft further comprises a chamber disposed adjacent to the sprag clutch extending at least partially into the shaft.

10. The fastener removal assembly of claim 9, wherein the sprag clutch is configured to receive a top portion of a body of the fastener and actuate the top portion to rotate with respect to a housing of the fastener.

11. The fastener removal assembly of claim 10, wherein the set of gripping jaws is configured to receive the housing of the fastener and apply a radial compressive force to secure the housing of the fastener.

* * * * *